United States Patent [19]
Gehlert

[11] 3,754,818
[45] Aug. 28, 1973

[54] PROJECTOR FOR PHOTOGRAPHIC TRANSPARENCIES

[75] Inventor: Rolf Gehlert, Munich, Germany

[73] Assignee: Agfa-Gevaert Aktiengesellschaft, Leverkusen, Germany

[22] Filed: Feb. 12, 1971

[21] Appl. No.: 114,906

[30] Foreign Application Priority Data
Feb. 17, 1970 Germany .................. G 70 05 576.4

[52] U.S. Cl. .................................. 353/92, 353/114
[51] Int. Cl. ............................................ G03b 23/04
[58] Field of Search .................................353/88–92

[56] References Cited
UNITED STATES PATENTS

| | | | |
|---|---|---|---|
| 3,334,544 | 8/1967 | Zillmer | 353/92 |
| 3,413,060 | 11/1968 | Rube | 353/92 |
| 2,909,098 | 10/1959 | Briskin | 353/88 |
| 3,049,052 | 8/1962 | Korf | 383/92 |
| 3,013,353 | 12/1961 | Zillman | 353/116 |
| 3,260,155 | 7/1966 | Councilman | 353/91 |
| 2,401,506 | 6/1946 | Pechkvanz | 353/91 |
| 3,411,845 | 11/1968 | Pester | 353/88 |

*Primary Examiner*—Louis R. Prince
*Assistant Examiner*—A. J. Mirabito
*Attorney*—Michael S. Striker

[57] ABSTRACT

A projector for color slides wherein a shutter moves in front of the slide which is held in projection position before the slide begins its return movement into the magazine and wherein the shutter moves out of registry with a slide in projection position after the slide comes to a full stop. The shutter is movable by a lever which is pivotable by the slide changer, by a rotary electromagnet or motor which is energizable by the slide changer, or by a disk which is rotated by a motor and has a cam cooperating with a follower on a linkage which is connected with the shutter. The disk also carries an eccentric wiper which cooperates with a cam on the slide changer to move the slide changer while the shutter is at a standstill in front of a slide in projection position.

9 Claims, 3 Drawing Figures

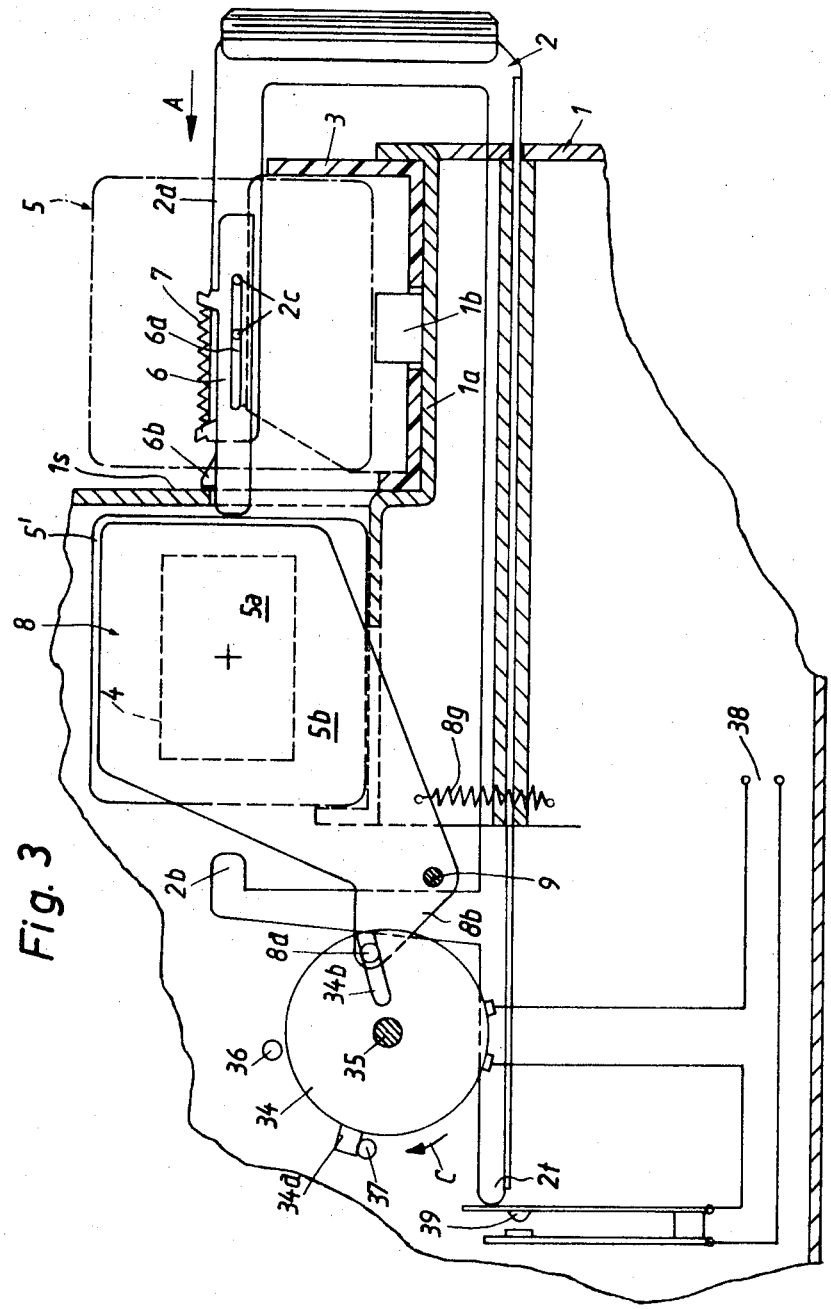

PROJECTOR FOR PHOTOGRAPHIC TRANSPARENCIES

BACKGROUND OF THE INVENTION

The present invention relates to improvements in projectors for photographic transparencies of the type commonly known as color slides. More particularly, the invention relates to improvements in slide projectors of the type wherein the projection of light onto a screen or the like is interrupted during transport of slides between the compartments of a magazine or tray and a projection position in which a slide registers with the optical system of the projector.

It is already known to employ the slide changer of a slide projector as a means to effect movements of a shutter blade or a like light-obstructing element between an operative position in which the blade overlies a slide in projection position and an inoperative position in which the image of the slide in projection position is projected onto a screen. As a rule, the blade starts to leave its operative position before a slide reaches the projection position and the blade starts to return to its operative position while the slide is in the process of being transported from the projection position toward the corresponding compartment of the tray. This results in a so-called "wiping" effect, namely, in a gradual exposure and in a gradual concealment of the slide while the projected image moves with reference to the screen.

SUMMARY OF THE INVENTION

An object of the invention is to provide a slide projector with novel and improved means for effecting movements of a shutter blade or an analogous light-obstructing device between operative and inoperative positions in such a way that the light-obstructing device moves only while a slide dwells in the projection position.

Another object of the invention is to provide a slide projector wherein the movements of the light-obstructing device can be effected by the mechanism which serves to transport the slides and to advance the magazine or tray wherein the slides are stored.

A further object of the invention is to provide a slide projector with a light-obstructing device which can be moved between operative and inoperative positions at the will of the operator or at predetermined intervals.

Still another object of the invention is to provide a slide projector with novel means for operating the advancing mechanism for the slide magazine, for operating the parts which shift the slides between the magazine and a projection position, and for operating the light-obstructing device.

A further object of the invention is to provide a novel slide changer for use in projectors for photographic transparencies.

The improved slide projector comprises a ramp or like means for supporting slides in a transfer position, shifting means which is movable between two positions to thereby transport discrete slides between the transfer position and a projection position of registry with the optical system of the projector, shutter means movable between operative and inoperative positions in which the shutter means respectively overlaps a slide in the projection position (to prevent the projection of the image on such slide onto a screen or the like) and is out of registry with the slide in the projection position, and displacing means for the shifting means and shutter means. The displacing means comprises a displacing member which is movable from a first position to a second position to thereby effect a movement of the shifting means from one to the other position whereby the shifting means moves a slide from the transfer position to the projection position while the shutter means dwells in its operative position. The displacing member is further movable beyond the second position to a third position while the slide dwells in the projection position to thereby effect movement of the shutter means from the operative position to the inoperative position so that the image of the slide in the projection position is projected onto a screen following full stoppage of such slide in the projection position. The displacing member is further movable from the third position to a fourth position to thereby effect a return movement of the shutter means from the inoperative position to the operative position and to thus terminate the projection of the image while the slide continues to dwell in the projection position. The displacing member is also movable beyond the fourth position to thereby effect movement of the shifting means from the other to the one position whereby the shifting means returns to slide from the projection position to the transfer position while the shutter means dwells in its operative position.

The novel features which are considered as characteristic of the invention are set forth in particular in the appended claims. The improved projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a schematic fragmentary transverse vertical sectional view of a third projector.

DESCRIPTION OF THE PREFERRED EMBODIMENTS

Figure 1:
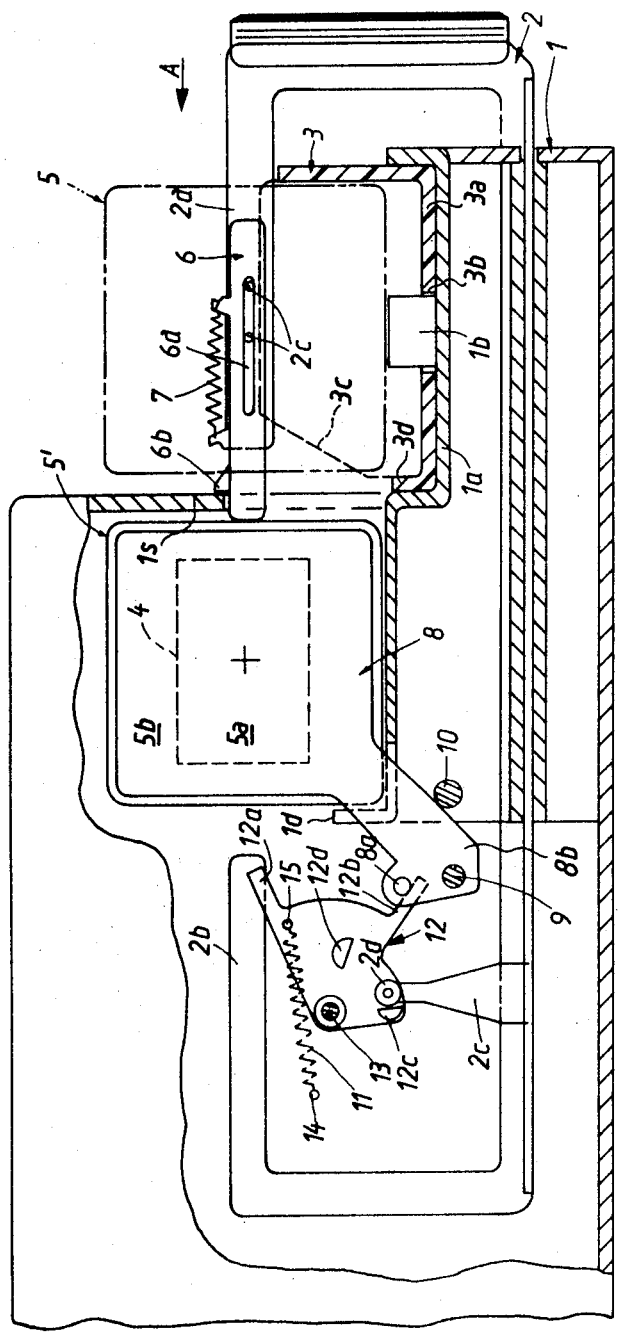
FIG. 1 is a schematic fragmentary transverse vertical sectional view of a projector which embodies one form of the invention.

Referring first to FIG. 1, there is shown a slide projector which comprises a housing 1 supporting a displacing member or slide changer 2 which is reciprocable in and counter to the direction indicated by an arrow A. The plane of reciprocation of the slide changer 2 is normal to the direction of forward movement of a removable slide magazine or tray 3 (here shown as a straight tray) which is guided by a channel 1a of the housing 1 and has a bottom wall 3a provided with a longitudinally extending cutout or slot 3b for a wedge-like lifting member or ramp 1b of the housing 1. The tray 3 is provided with customary transversely extending partitions 3c which define compartments for individual color slides 5 (one shown by phantom lines). The cutout 3b extends into the lower portions of the partitions 3c so that the ramp 1b can automatically lift at least one slide 5 to a level at which the thus lifted slide assumes a transfer position and can move sideways over the relatively low left-hand side wall 3d of the magazine 3 in response to movement of the slide changer 2 in the direction indicated by arrow A. That slide 5 which has been lifted to such transfer position is then located in the plane of the slide changer 2 between two slide-engaging or shifting arms 2a and 2b. A slide 5 which rests in transfer position on the ramp 1b and is located in the plane of the slide changer 2 has its transparent portion 5a located at the level of a projection gate 4 which, in turn, is located in the path of light issuing from the projection lamp 18 (see FIG. 2) and being reflected by a conventional reflector 19 so as to pass through two condensor lenses 20, 21, through the gate 4 and through a projection lens system 22 to have its image projected onto a screen or the like, not shown.

The arm 2a of the slide changer 2 does not directly engage the slides 5 but it carries a slide-engaging member or pusher 6 which is guided by a pin-and-slot connection 2c, 6a so as to permit a movement of the arm 2a in the direction indicated by arrow A while the pusher 6 remains at a standstill. This pusher 6 has a rounded end portion or head which engages the edge face of the frame 5b of that slide 5 which is located in transfer position in the plane of the slide changer 2 while the latter performs a forward (or inward) movement from a first to a second position to thereby transport the slide 5 from the ramp 1b, over the side wall 3d and to a projection position 5' in which the transparent portion 5a registers with the gate 4.

In accordance with a feature of the invention, the pusher 6 is yieldably connected to the arm 2a of the slide changer 2 by a helical coupling spring 7 which pulls the pusher in a direction to the left, as viewed in FIG. 1, so as to normally maintain the right-hand guide pin 2c in the rightmost portion of the slot 6a. The spring 7 is strong enough to maintain the pusher 6 in such end position (as shown in FIG. 1) while the head of the pusher bears against the edge face of the frame 5b on that slide 5 which rests in transfer position on the ramp 1b and while the slide changer 2 moves (in the direction indicated by arrow A) from the first position to the second position which is shown in FIG. 1. Once the left-hand edge face of the frame 5b on the thus transported slide 5 reaches the position shown by solid lines (i.e., as soon as the slide 5 reaches the projection position 5'), the frame 5b is arrested by a fixed stop 1d of the housing 1 but the slide changer 2 is free to continue its movement in the direction indicated by arrow A to move toward a third position whereby the spring 7 expands and permits the arm 2a to move with reference to the pusher 6 to the extent determined by the length of the slot 6a. Such movement of the slide changer 2 with reference to the pusher 6 from the illustrated second position to a third position is utilized to move a light-obstructing shutter blade or mask 8 from the illustrated operative position to an inoperative position in which the blade 8 is out of registry with the projection gate 4 while the freshly delivered slide 5 already dwells in its projection position 5'.

In the embodiment of FIG. 1, the shutter blade 8 has an extension 8b which is turnable about the axis of a horizontal pivot pin 9 mounted in the housing 1 and extending in parallelism with the guide channel 1a for the tray 3. In the illustrated operative or light-obstructing position of the blade 8, the extension 8b abuts against a fixed arresting member or post 10 in the housing 1 whereby the blade 8 overlies the gate 4 in front of the slide 5 (in the projection position 5') so that the image of the transparent portion 5a of such slide is not projected onto a screen.

The displacing means for moving the blade 8 between the illustrated operative position and its second or inoperative position further comprises a projection or bracket 2c mounted on the slide changer 2 and carrying at its upper end a roller 2d which is disposed between two followers 12c, 12d provided on a motion transmitting lever 12 which is pivotable on a pin 13 provided in the housing 1 and extending in parallelism with the pivot pin 9. When the slide changer 2 reaches the second position which is shown in FIG. 1 (while moving in the direction indicated by the arrow A), it moves the roller 2d close to or into actual abutment with the follower 12c of the motion transmitting lever 12. As the slide changer 2 continues to move in the direction indicated by the arrow A, i.e., while it moves from the second to the third position, the roller 2d pivots the motion transmitting lever 12 by way of the follower 12c whereby the lever 12 turns in a clockwise direction to stress a spring 11 which is connected to a post 14 of the housing 1 and to a post 15 on the lever 12. As clearly shown in FIG. 1, the spring 11 is of the type known as an over-the-center spring which is capable of biasing the lever 12 to either one of two end positions, namely, to the first end position shown in FIG. 1 and to a second end position in which the follower 12d bears against the roller 2d on the bracket 2c. The spring 11 causes the lever 12 to snap from the one to the other end position or vice versa when the lever is pivoted to and only slightly beyond a neutral or intermediate position in which the axis of the pivot pin 13 is located in the common plane of the axes of the posts 14 and 15.

The lever 12 has a first portion or arm 12b which abuts against a projection or stud 8a of the shutter blade 8 when the lever 12 assumes the position shown in FIG. 1; the spring 11 then biases the lever 12 in a counterclockwise direction so that the arm 12b bears against the stud 8a and maintains the extension 8b in abutment with the arresting member 10 whereby the blade 8 overlies the gate 4. The arm 12b begins to move away from the stud 8a when the roller 2d pushes the follower 12c to pivot the lever 12 in a clockwise direction (and to stress the spring 11) but the blade 8 remains in the operative position under the action of gravity. However, when the slide changer 2 reaches or approaches its third (left-hand end) position, the post 15 moves into the common plane of the post 14 and pivot pin 13 whereby the spring 11 "snaps over" to propel the lever 12 in a clockwise direction and to cause a second arm or portion 12a of the lever to strike against the projection 8a to thus rapidly move the shutter blade 8 to the inoperative position. The counterclockwise pivotal movement of the blade 8 is terminated when the follower 12d of the lever 12 reaches the roller 2d on the bracket 2c of the slide changer 2. The blade 8 is then out of registry with the gate 4 and the image of the transparent portion 5a of the slide 5 in the projection position 5' is being projected onto a screen.

When the slide changer 2 performs a return stroke (counter to the direction indicated by the arrow A) to move from its third position toward a fourth position which coincides with the illustrated second position, the shifting or slide-engaging arm 2b advances toward the adjacent edge face of the frame 5b of slide 5 in the projection position 5' and the spring 7 is permitted to contract. At the same time, the roller 2d pivots the motion transmitting lever 12 in a counterclockwise direction (by way of the follower 12d which is biased against the roller 2d by the spring 11) whereby the post 15 again reaches the plane of the pivot pin 13 and post 14 to enable the spring 11 to propel the lever 12 back to the first end position shown in FIG. 1. The arm 12b then strikes against the projection 8a and pivots the blade 8 back to the illustrated operative position in which the extension 8b abuts against the arresting member 10. The counterclockwise pivotal movement of the motion transmitting lever 12 is terminated when the extension 8b abuts against the member 10 and the roller 2d is then free to bypass the follower 12d while the slide changer 2 moves beyond its fourth position and back toward its first position. The shifting arm 2b reaches the frame 5b of the slide 5 in projection position 5' after the blade 8 returns to the operative position so that the projection of the image is terminated before the slide 5 starts its return movement toward the transfer position, i.e., back into the corresponding compartment of the tray 3. The tray 3 is automatically advanced by a step to place the next slide 5 into the plane of the slide changer 2 before the slide changer completes its movement to the left-hand end position but after the slide 5 returns from the projection position 5' into the corresponding compartment. The slide changer 2 is then ready to transport the next slide from the transfer position on the ramp 1b to the projection position 5' of registry with the gate 4.

The rounded head of the pusher 6 is preferably provided with a lateral projection or lobe 6b which engages a stop shoulder 1s of the housing 1 when the slide 5 which is being moved sideways by the pusher 6 reaches the projection position 5' and abuts against or is close to the stop 1d of the housing 1. This prevents the rounded head of the pusher 6 from exerting an excessive pressure against the frame 5b of the slide in the projection position 5'. The lobe 6b and the stop shoulder 1s can replace the stop 1d of the housing 1 or vice versa.

Figure 2:
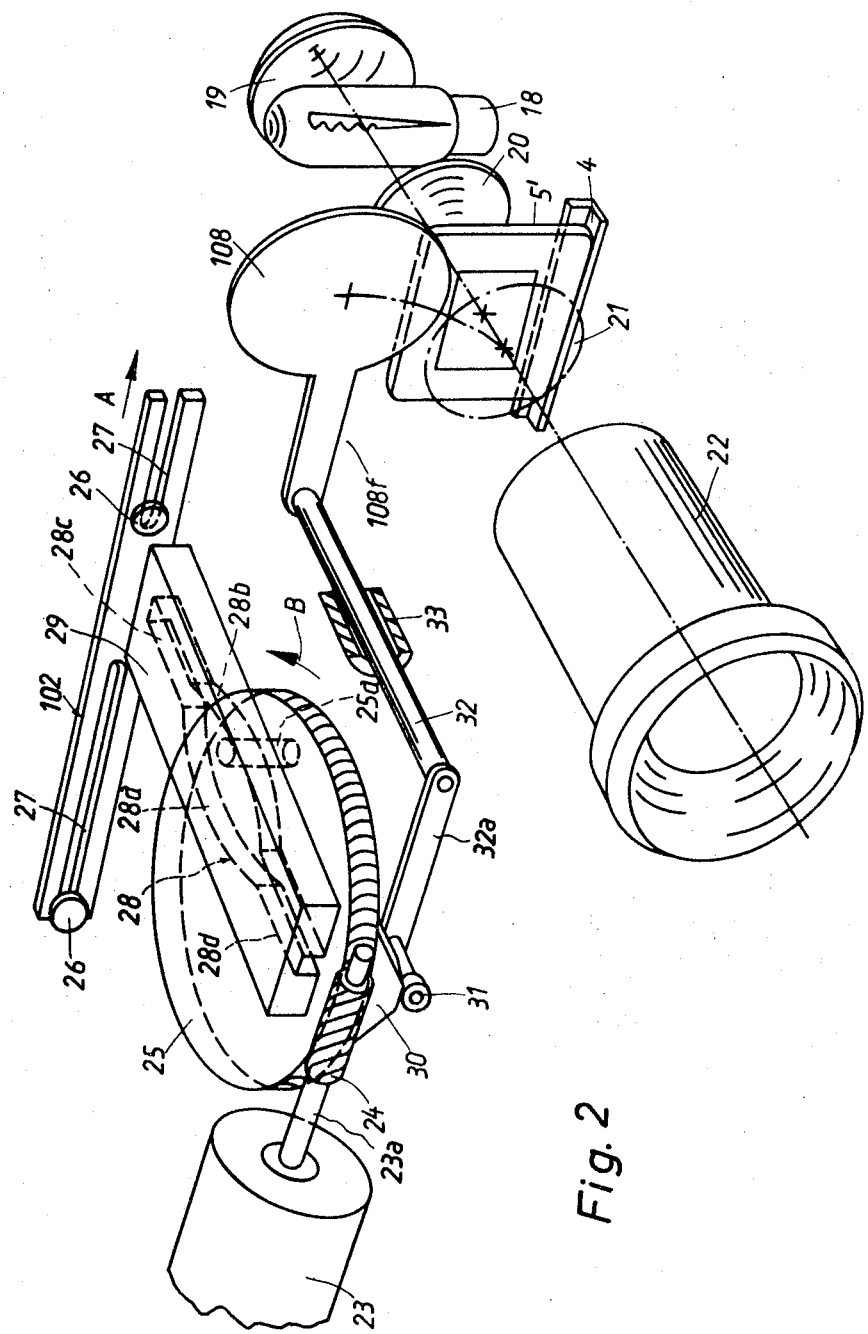
FIG. 2 is a fragmentary perspective view of a modified projector.

The slide projector of FIG. 2 comprises the aforementioned reflector 19 which is located behind the projection lamp 18. The latter is located behind the condensor lens 20 which is located behind the gate 4. The other condensor lens 21 is disposed between the gate 4 and the lens system 22. FIG. 2 further shows a circular or oval shutter blade 108 which is illustrated in the inoperative position. The blade 108 has an extension or arm 108f which is secured to a shaft 32 rotatable in a stationary bearing 33.

The slide changer 102 of the displacing means for slides 5 and shutter blade 108 is reciprocable by an electric motor 23 having an output shaft 23a provided with a worm 24 meshing with a disk-shaped worm wheel 25. The wheel or disk 25 constitutes a displacing member which performs several functions including advancing the tray (not shown) by a step after a slide 5 returns from the projection position 5' into the corresponding compartment of the tray. The exact manner in which the disk 25 (or a member which rotates therewith) advances the tray forms no part of the present invention. The slide changer 102 has elongated slots 27 for stationary guide pins 26 which confine the slide changer to reciprocatory movement in and counter to the direction indicated by the arrow A. The slide changer 102 receives motion from the disk 25 by way of an eccentric pin-shaped wiper 25a which extends into the space 28 between suitably configured faces 28a, 28b of a cam 29 secured to or forming an integral part of the member 102. When the motor 23 drives the disk 25 in the direction indicated by an arrow B, the wiper 25a causes the slide changer 102 to move back and forth between two end positions. While moving in the direction indicated by the arrow A, the slide changer 102 transports a slide from a transfer position in the corresponding compartment of the tray to the projection position 5', and such slide is returned into the corresponding compartment of the tray when the slide changer 102 performs a return stroke. In the third angular position of the disk 25 which is shown in FIG. 2, the wiper 25a permits the slide changer 102 to dwell in that end position which the slide changer reaches upon completed transport of a slide 5 from the transfer position to the projection position 5'. The internal cam face 28a of the cam 29 is configurated and located in such a way that it abuts against but is not moved by the wiper 25a when the slide changer 102 assumes the other end position subsequent to completion of a return movement of a slide from the projection position 5' back into the corresponding compartment of the tray. The wiper 25a travels along an arc of 180° during movement of the slide changer 102 from the one to the other end position. In such other end position of the slide changer 102, the disk 25 is free to rotate through a predetermined angle without causing any lengthwise displacement of the slide changer. Such angular movement of the disk 25 is used to advance the tray by a step so as to place a fresh slide 5 into registry with the shifting or slide-engaging arms (not shown) of the slide changer. (The manner, in which the said slide changer or the said disk advances the said tray is described, for example, in German Utility Model 1 806 756 or in British Patent 1 065 668.)

The disk 25 is also free to rotate with reference to the cam 29 without moving the slide changer 102 when the wiper 25a moves toward and beyond the angular position shown in FIG. 2, i.e., when the slide changer 102 assumes that end position which it reaches upon completed transport of a slide to the projection position 5'. This second movement of the disk 25 and of its wiper 25a with reference to the slide changer 102 is utilized to move the shutter blade 108 out of registry with the projection gate 4 and with the slide which assumes the projection position 5' and to thereupon return the shutter blade to its operative position. To this end, the underside of the disk 25 carries a cam 30 which can engage a roller follower 31 provided on an arm 32a of the shaft 32. The cam 30 can push the roller follower 31 downwardly to the lower end position which is shown in FIG. 2 whereby the linkage including the arm 32a, shaft 32 and extension 108f lifts the shutter blade 108 to the illustrated inoperative position. The motor 23 is then arrested in response to opening of a switch (not shown, which can be actuated by the arm 32a or by the extension 108f) to remain idle for a preselected interval or for an interval which is determined by the operator of the projector. The angular movement of the disk 25 with reference to the cam 29 of the slide changer 120 corresponds to leftward movement of the slide changer 2 beyond the second position shown in FIG. 1. It will be noted that the cam 30 lifts the shutter blade 108 above the gate 4 after the slide which has been transported by the slide changer 102 already assumes the projection position 5'. As shown in FIG. 2, the cam 30 completes the lifting of the shutter blade 108 above the gate 4 when the wiper 25a reaches the median portion of the face 28b. The configuration of this face 28b is such that it does not cause the cam 29 to change its position in or counter to the direction indicated by the arrow A.

When the motor 23 is started again, the cam 30 moves away from the roller follower 31 whereby the shutter blade 108 descends by gravity (or under the action of a return spring, not shown) to overlie the gate 4 before the slide changer 102 begins its return stroke. During movement of the cam 30 away from the roller follower 31, the wiper 25a travels along the second half of the face 28a in the space 28 without moving the slide changer 102 counter to the direction indicated by the arrow A. The wiper 25a thereupon enters the relatively narrow slot-shaped portion 28c of the space 28 and pushes the slide changer 102 by way of the cam 29 so that the slide changer returns the slide from the projection position 5' into the corresponding compartment of the tray. It will be seen that the return movement of slides from the projection position 5' into the tray takes place after the shutter blade 108 returns to its operative position.

The motor 23 can rotate the disk 25 from a first angular position, in which one of the two slide-engaging portions of the slide changer 102 is ready to move a slide 5 from the transfer position toward the projection position 5', toward a second angular position (corresponding to the position of the slide changer 2 shown in FIG. 1) in which the one slide-engaging portion of the slide changer 102 completes the transport of a slide to the projection position 5'. At such time, the wiper 25a is located at the inner end of the slot 28d of the cam 29 and is about to begin its movement along the face 28b. As the disk 25 moves from its second angular position to the third angular position which is shown in FIG. 2, the cam 30 causes the roller follower 31 to lift the shutter blade 108 to the illustrated inoperative position by way of the linkage 32a, 32, 108f while the slide 5 dwells in the projection position 5'. Thus, the image of the slide appears on the screen. When the motor 23 is started again, it moves the disk 25 from the illustrated third angular position to a fourth angular position in which the wiper 25a is ready to enter the slot 28c. During such movement of the disk 25, the cam 30 moves beyond the roller follower 31 and permits the shutter blade 108 to reassume its operative position before the slide starts to leave its projection position 5'. The motor 23 thereupon rotates the disk 25 beyond the fourth angular position whereby the wiper 25a enters the slot 28c and transports the slide changer 102 counter to the direction indicated by the arrow A so that the other slide-engaging portion of the slide changer returns the slide from the projection position 5' to the transfer position. As the motor 23 continues to rotate the disk 25, the wiper 25a travels along the face 28a and the disk 25 then causes the tray to advance by a step while the slide changer 102 is idle and while the shutter blade 108 dwells in the operative position. The transport of the next slide 5 from the transfer position to the projection position 5' begins as soon as the wiper 25a enters the slot 28d. The same procedure is then repeated again and again to project the images of successive slides and to move the tray forwardly in stepwise fashion. The shutter blade 108 always dwells in the operative position while a slide travels toward the projection position 5' and also while a slide moves away from such projection position and back toward the transfer position, i.e., into the corresponding compartment of the tray.

An important advantage of the improved projector is that the so-called "wiping" effect is eliminated not only when the slide-engaging portions are moved by a motor (FIG. 2) but also when the slide changer is reciprocated by hand (FIG. 1). The spring 11 insures that the shutter blade 8 is rapidly propelled from its operative position to its inoperative position or vice versa. The speed of the disk 25 and the configuration of the cam 30 can also be selected in such a way that the movement of the shutter blade 108 to or from its operative position is completed within a very short interval of time.

Referring to FIG. 3, there is shown a third slide projector which is similar to the projector of FIG. 1. The main difference between the projectors of FIGS. 1 and 3 is that the latter employs a rotary electromagnet 34 which replaces the pivotable motion transmitting lever 12 of FIG. 1. The shutter blade 8 is permanently biased to its operative position (in front of the gate 4) by a helical spring 8g one end of which is connected to the housing 1. The electromagnet 34 is rotatable about the axis of a shaft 35 and has a radially extending slot 34b for the projection 8a on the extension 8b of the shutter blade 8. The latter is pivotable on the pin 9. The electromagnet 34 further comprises a radially extending protuberance or lug 34a which is movable between two stationary abutments 36 and 37. A normally open electric switch 39 is connected in circuit with an energy source 38 and with the electromagnet 34 so that the latter is energized and rotates in the direction indicated by an arrow C when the switch 39 is closed by an actuating portion or trip 2t of the slide changer 2. The trip 2t can close the switch 39 to energize the electromagnet 34 when the slide changer 2 moves beyond the second position shown in FIG. 3 (in which the projection 6b of the pusher 6 bears against the stop shoulder 1s of the housing 1 and a slide 5 assumes the projection position 5').

When the switch 39 is closed by the trip 2t (after the slide 5 assumes the projection position 5'), the electromagnet 34 turns in the direction indicated by the arrow C to move its protuberance 34a from the abutment 37 toward the abutment 36 whereby the surfaces bounding the slot 34b cause the projection 8a to pivot the shutter blade 8 against the opposition of the return spring 8g to move the blade to its inoperative position so that the image of the transparent portion 5a of the slide in the position 5' is projected onto the screen. The electromagnet 34 is arrested when its protuberance 34a reaches the abutment 36; the shutter blade 8 is then already located in the inoperative position. When the operator decides to return the slide from the projection position 5' back to the transfer position in the corresponding compartment of the tray 3, the slide changer 2 is moved back from its thrid position toward a fourth position which coincides with the second position shown in FIG. 3 whereby the trip 2t permits the switch 39 to open to deenergize the electromagnet 34. The spring 8g contracts and rapidly returns the shutter blade 8 to the illustrated operative position whereby the projection 8a returns the protuberance 34a into engagement with the abutment 37 which terminates the angular movement of the shutter blade in a clockwise direction. All this takes place before the shifting or slide-engaging arm 2b of the slide changer 2 reaches the left-hand edge face of the frame 5b on that slide which dwells in the projection position 5'. Thus, the slide leaves the position 5' after the shutter blade 8 reassumes its operative position. All such reference characters which are shown in FIG. 3 but not specifically mentioned denote parts which correspond to similarly referenced parts of the projector shown in FIG. 1.

It is clear that the spring 8g can be omitted if the blade 8 is mounted in such a way that it tends to pivot in a clockwise direction, at least at such time when it dwells in the inoperative position. Furthermore, the electromagnet 34 can be unbalanced so that it automatically rotates in a counterclockwise direction when the switch 39 opens to thereby return the shutter blade 8 to the illustrated operative position. It is equally within the purview of the invention to replace the rotary electromagnet 34 with an electric motor which rotates in a clockwise direction in response to closing of the switch 29 to thereby cause a disk or the like on its output shaft to move the shutter blade 8 to the inoperative position. The output shaft of such electric motor can also drive the shutter blade 8 by way of a link train or a gear train.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a slide projector, a combination comprising means for supporting slides in a transfer position; shutter means movable between operative and inoperative positions in which said shutter means respectively overlaps and is out of registry with a slide in a projection position remote from said transfer position; a single motion transmitting device; and a manually operable slide changer provided with slide shifting means and movable through cycles each of which includes a movement relative to said motion transmitting device from a first position to a second position to thereby advance a slide from said transfer position to said projection position by way of said shifting means, a movement from said second position to a third position to thereby move said shutter means from said operative position to said inoperative position by way of said motion transmitting device while a slide dwells in said projection position, a movement from said third position to said second position to thereby move said shutter means from said inoperative position to said operative position by way of said motion transmitting device while a slide continues to dwell in said projection position, and a movement relative to said motion transmitting device from said second position to said first position to thereby return a slide from said projection position to said transfer position by way of said shifting means while said shutter means continues to assume said operative position, said shifting means comprising a slide-engaging member which moves slides from said transfer position to said projection position in response to movement of said slide changer from said first position to said second position and a spring yieldably connecting said slide-engaging member with said slide changer to permit a movement of said slide changer relative to said slide-engaging member from said second position to said third position and from said third position back to said second position, said spring being arranged to store energy in response to movement of said slide changer from said second position to said third position.

2. In a slide projector, a combination comprising means for supporting slides in a transfer position; shutter means movable between operative and inoperative positions in which said shutter means respectively overlaps and is out of register with a slide in a projection position remote from said transfer position; a single motion transmitting device; a manually operable slide changer provided with slide shifting means and movable through cycles each of which includes a movement relative to said motion transmitting device from a first position to a second position to thereby advance a slide from said transfer position to said projection position by way of said shifting means, a movement from said second position to a third position to thereby move said shutter means from said operative position to said inoperative position by way of said motion transmitting device while a slide dwells in said projection position, a movement from said third position to said second position to thereby move said shutter means from said inoperative position to said operative position by way of said motion transmitting device while a slide continues to dwell in said projection position, and a movement relative to said motion transmitting device from said second position to said first position to thereby return a slide from said projection position to said transfer position by way of said shifting means while said shutter means continues to assume said operative position, said motion transmitting device being respectively arranged to pivot from a first position to a second position and vice versa in response to movement of said slide changer from said second position to said third position and vice versa, said motion transmitting device comprising a pair of followers one of which is engaged by said slide changer during movement from said second to said third position of said slide changer and the other of which is engaged by said slide changer during movement of said slide changer from said third position to said second position; and means for permanently biasing said motion transmitting device to one of said first and second position thereof.

3. A combination as defined in claim 2, wherein said shutter means is pivotable between said operative and inoperative positions thereof and said motion transmitting device further comprises a first portion which pivots said shutter means to said inoperative position in response to engagement between said slide changer and said one follower and a second portion which pivots said shutter means to said operative position in response to engagement between said slide changer and said other follower.

4. In a slide projector, a combination comprising means for supporting slides in a transfer position; shutter means movable between operative and inoperative positions in which said shutter means respectively overlaps and is out of register with a slide in a projection position remote from said transfer position; a motion transmitting device; and a slide changer provided with slide shifting means and movable through cycles each of which includes a movement relative to said motion transmitting device from a first position to a second position to thereby advance a slide from said transfer position to said projection position by way of said shifting means, a movement from said second position to a third position to thereby move said shutter means from said operative position to said inoperative position by way of said motion transmitting device while a slide dwells in said projection position, a movement from said third position to said second position to thereby move said shutter means from said inoperative position to said operative position by way of said motion transmitting device while a slide continues to dwell in said projection position, and a movement relative to said motion transmitting device from said second position to said first position to thereby return a slide from said projection position to said transfer position by way of said shifting means while said shutter means continues to assume said operative position, said shifting means comprising a slide-engaging member which moves slides from said transfer position to said projection position in response to movement of said slide changer from said first position to said second position and resilient means yieldably connecting said slide-engaging member with said slide changer to permit a movement of said slide changer relative to said slide-engaging member from said second position to said third position and from said third position back to said second position, said resilient means being arranged to store energy in response to movement of said slide changer from said second position to said third position.

5. A combination as defined in claim 4, wherein said motion transmitting device is respectively arranged to move from a first to a second position and vice versa in response to movement of said slide changer from said second to said third position and vice versa, and further comprising means for permanently biasing said motion transmitting device to one of said first and second positions thereof.

6. A combination as defined in claim 5, wherein said biasing means comprises a single spring.

7. A combination as defined in claim 5, wherein said motion transmitting device is rotatable between said first and second positions and further comprising means for articulately connecting said motion transmitting device to said shutter means.

8. A combination as defined in claim 7, wherein said motion transmitting device is a rotary electromagnet and said means for articulately connecting said motion transmitting device with said shutter means comprises a pin-and-slot connection.

9. A combination as defined in claim 5, wherein said motion transmitting device is an electromagnet which is rotatable between said first and second positions thereof, said slide changer further comprising means for energizing said electromagnet to thereby effect a movement of said electromagnet between said positions thereof in response to movement of said slide changer to one of said third and second positions thereof.

* * * * *